Oct. 25, 1938.                H. WAGNER                 2,134,591
              METHOD OF MANUFACTURE OF INNER TUBES FOR VEHICLE TIRES
                   Original Filed Jan. 6, 1936      2 Sheets-Sheet 1
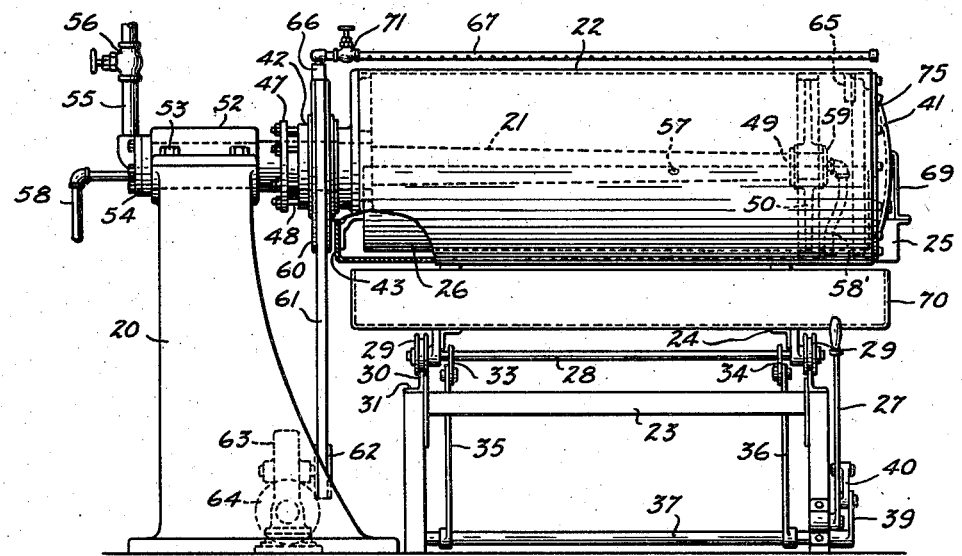
Fig.1
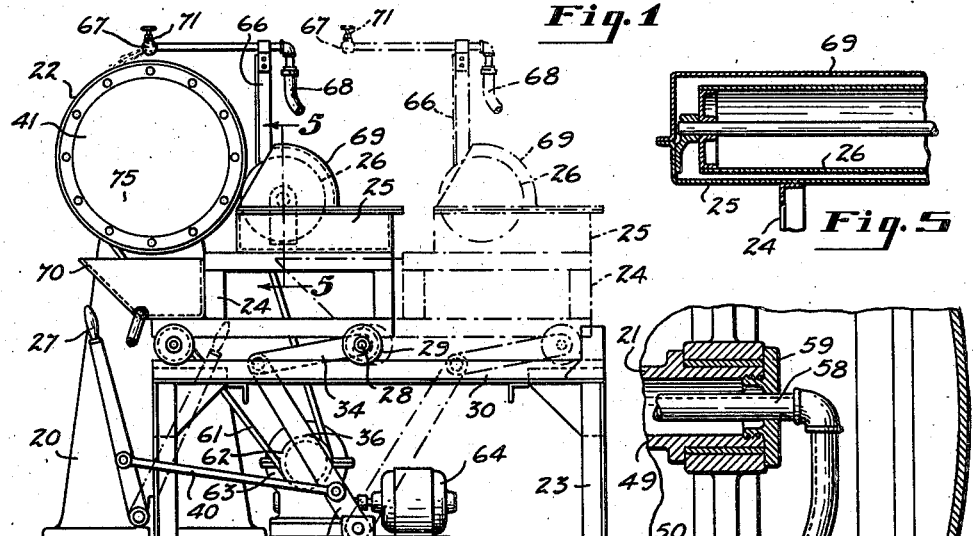
Fig.2
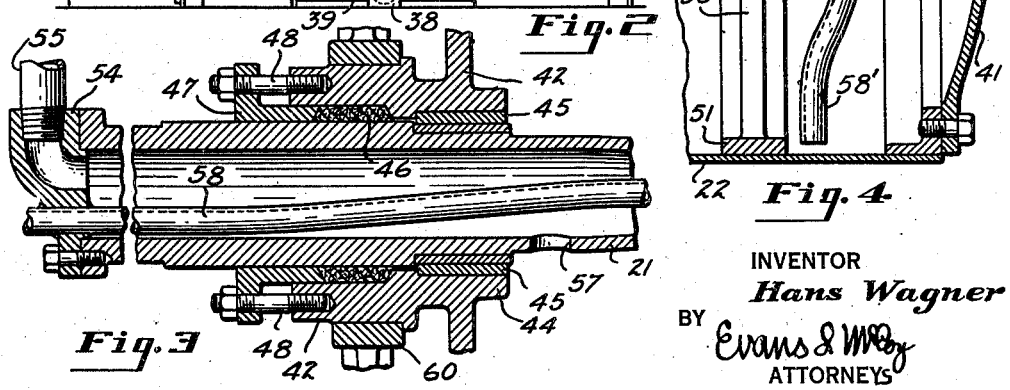
Fig.3
Fig.5
Fig.4
INVENTOR
Hans Wagner
BY Evans & M^cey
ATTORNEYS Oct. 25, 1938.     H. WAGNER     2,134,591

METHOD OF MANUFACTURE OF INNER TUBES FOR VEHICLE TIRES

Original Filed Jan. 6, 1936     2 Sheets-Sheet 2

INVENTOR
*Hans Wagner*
BY
*Evans & McCoy*
ATTORNEYS

Patented Oct. 25, 1938

2,134,591

UNITED STATES PATENT OFFICE 2,134,591

METHOD OF MANUFACTURE OF INNER TUBES FOR VEHICLE TIRES

Hans Wagner, Akron, Ohio, assignor of eight per cent to Joseph P. Murphy, Jr., Brooklyn, N. Y., and two per cent to Stephen E. Ryan, Forest Hills, N. Y.

Application January 6, 1936, Serial No. 57,754
Renewed January 29, 1938

7 Claims. (Cl. 154—14)

This invention relates to inner tubes for pneumatic tires and more particularly to an improved apparatus and an improved method for the manufacture of inner tubes.

An object of my invention is to provide an improved method of manufacture of laminated inner tubes from latex or liquid rubber cement.

A still further object of this invention is to provide a machine for the manufacture of inner tubes which is inexpensive to operate, simple in construction, and which will produce new and improved inner tubes.

A further object of this invention is to provide a method for the manufacture of inner tubes in which the base of a valve stem may be inserted between laminae of the tube before the tube is vulcanized.

In the accompanying drawings, which constitute a part of my disclosure, I have illustrated a preferred embodiment of a machine for carrying out my invention, in which Figure 1 is a front elevation of the device;

Fig. 2 is a side elevation of the device, illustrating by broken lines, the position of the carriage in a withdrawn position;

Fig. 3 is an enlarged fragmentary view, in section, showing the steamtight journal;

Fig. 4 is a fragmentary view, in section, of the free end of the cylindrical drum;

Fig. 5 is a fragmentary vertical section on line 5—5 of Fig. 2;

Figure 6:
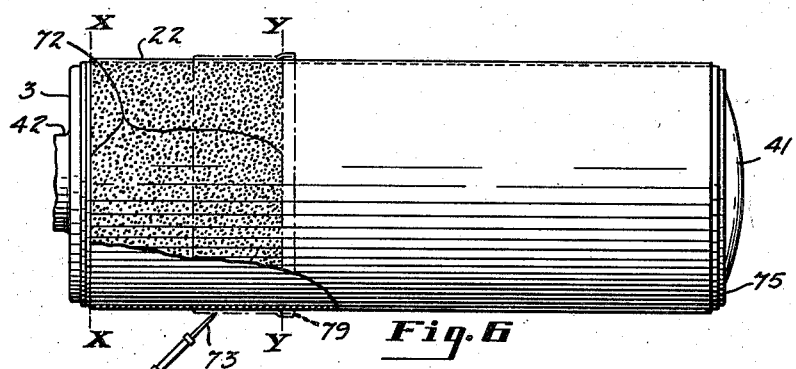
Fig. 6 is a plan view of the cylindrical drum coated with rubber and illustrating the manner of forming the tube on a drum.

Briefly, my method of manufacturing vehicle tire inner tubes consists of coating a cylindrical drum having a diameter of about the inside diameter of the finished tube with a rubber film. At one end of the cylindrical drum a portion of this rubber film or sheet is folded back upon itself, the intermediate portion having first been coated with a substance to render the rubber film nonadhesive. Zinc stearate, for example, is satisfactory for this purpose. An air needle is then inserted through one thickness of this rubber film, and the portion of the film folded back upon itself is inflated to form a tubular or annular shell disposed circumferentially about the drum. This inflated portion of the film is then rolled over the portion which remains about the cylindrical drum. It will be seen that, as the inflated portion rolls along the drum, it will gather up the rubber film in a plurality of concentric layers. Just before the end of the drum is reached a suitable valve stem, having an enlarged rubber base, is inserted through the initial layer of rubber film into a pocket in the drum provided for that purpose. The rubber film is then rolled off the drum, carrying the base of the valve stem embedded in it. A suitable hot implement may be inserted through the valve stem to suitably form an inflation opening through the concentric layers of rubber, and effecting a communication between the valve stem and the interior of the tube. From this point the processing of the tube is essentially the same as that now carried out in conventional inner tube manufacture; that is to say, it is placed in a suitable mold where it is inflated to a predetermined pressure, and heat applied to vulcanize the rubber. A more detailed description of this process and method may now be had by referring to the drawings.

The machine for carrying out my invention is provided with a pedestal 20. Secured in this pedestal is a supporting arm 21 upon which is mounted a rotatable cylindrical drum 22. Beneath the aforesaid drum 22 and in an offset position is a framework 23 supporting a carriage 24 provided with a tank 25 for holding the rubber composition out of which the tube is to be made into which fits a dip roller 26. The arrangement of this dip roller, tank and carriage, supported by the aforesaid framework 23, is such with respect to the drum 22 that, by suitable manipulation of a lever 27, the dip roller 26 may be brought into contact with the aforesaid drum 22. The carriage 24 is provided with axles 28 on which are journaled suitable wheels 29 running on a suitable track formed by the flanges 30 of the angleirons 31 of the frame 23.

The frame 23 is so positioned with respect to the drum 22 that when the carriage 24 is in the position illustrated by the full lines of Fig. 2, the dip roller 26 will be in contact with the drum 22. The carriage 24 may be moved upon the wheels 29 to the withdrawn position illustrated by the broken line of Fig. 2. Although any suitable means for performing this movement of the carriage 24 may be employed, I have selected the mechanism comprising the links 33 and 34, pivotally connected to the free end of the bell crank arms 35 and 36 which are pivoted on the shaft 37 turning in journals 38. One end of the shaft 37 has a short crank arm 39 affixed thereto which has its free end connected by the link 40 to a suitable point on the lever 27.

It will be seen that, by manipulation of the lever 27, the carriage 24 may be moved back and forth upon the frame 23, bringing the dip roller 26 into and out of contact with the drum 22.

It is desirable, for reasons to be hereinafter pointed out, to have the drum 22 heated and, although this may be done by any conventional method, I prefer to use steam. To make the drum steamtight one end of the drum is sealed by the head 41 and the other end of the drum is provided with a head 43 having a steamtight journal 42. The cylindrical drum 22 is supported on this journal by the head 43 which terminates in the bearing portion 44 rotatable on the supporting arm 21 and separated therefrom by the bearing metal 45. A portion of the member 42 is internally enlarged to accommodate the steam packing 46 which is compressed by means of the collar 47 held in place by the machine bolts 48. At the free end 49 of the supporting arm 21 is mounted a spider 50 which has a rim portion 51 circumferentially in contact with the inner surface of the cylindrical drum 22. The fixed end of the supporting arm 21 is held rigidly in the pedestal 20 by means of the cap 52 and bolts 53. The supporting arm 21 is hollow. At the fixed end is a steam cap 54 into which is fitted a steamline pipe 55 having a suitable valve 56. It will be seen that the steam for heating the drum may enter the hollow supporting arm 21 through the cap 54, and be introduced to the inside of the drum 22 through one or more holes 57 in the supporting arm 21. The waste pipe 58 with its depending portion 58' will carry off the condensate and waste steam. The waste pipe 58 passes through the cap 59 at the free end of the supporting arm 21, then through the entire length of the supporting arm 21 and the steam cap 54. If regulation of the flow of steam to the drum 22 is desired, any suitable steam trap (not shown) may be inserted in the pipe 58 to restrict the flow of steam but permit the flow of water.

The hub 44 of the steamtight journal 42 has a sheave 60 that accommodates the belt 61 which runs in the sheave 62 of the gear box 63 and is operated by the motor 64.

Adjacent the free end of the drum 22 is a pocket or recessed portion 65 communicating with the surface of the drum and of a size adapted to receive a valve stem. A perforated spray pipe 67 is supported over the cylindrical drum 22 by a suitable support 66 which is secured to and movable with the carriage 24. The spray pipe 67 is connected by a suitable flexible conduit 68 to a source of acid (not shown) which is used for the purpose of coagulating the rubber latex as it is collected on the rotating cylindrical drum 22 as well known to those skilled in the art.

In order to prevent objectionable collection of foreign matter in the latex tank 25, I propose to substantially enclose this tank and the roller 26 by means of a hood 69. The carriage 24 also carries a drip pan 70, which is adapted to catch the excess acid, if any.

In employing the above described apparatus for the manufacture of inner tubes for pneumatic tire casings, the valve 56 is opened to admit steam to the drum 22 and the latex tank 25 is filled with rubber latex of a suitable composition or with a suitable rubber cement. When the temperature of the cylindrical drum 22 has been raised to the heat best adapted for working the particular latex or cement composition being handled, the motor 64 is turned on and, through the above mentioned gear box 63, sheaves 60 and 62, and belt 61, the cylindrical drum 22 is rotated. By means of the lever 27 the carriage 24 is drawn across the framework 23 until the roller 26 is brought into peripheral contact with the cylindrical drum 22. As the friction between the drum 22 and roller 26 causes the latter to rotate, the valve 71 is opened and a spray of acid for coagulating the rubber latex is directed on the surface of the cylindrical drum 22. As the roller 26 rotates in the latex contained in the tank 25 its surface will become coated therewith and in turn transfer this latex to the surface of the cylindrical drum 22, it being a characteristic of the rubber latex to adhere to the warmer of two contacting rollers. This operation is continued until the latex on drum 22 is built up to a suitable thickness, approximately $\frac{1}{24}$ of an inch, at which time the valve 71 is closed to shut off the supply of coagulating acid, and the lever 27 is operated to withdraw the carriage 24 carrying the aforesaid latex tank 25, roller 26, drip pan 70, and acid spray pipe 67 from the vicinity of the cylindrical drum 22. The rubber latex now forms a continuous, uniform, thin rubber film about the cylindrical drum. At the end of said drum near the steam tight journal 42 a portion 72 of this thin rubber sheet is dusted with zinc stearate or soapstone and then folded back upon itself.

It may be desirable to trim the edges of the rubber sheet on the drum either to determine the length thereof, or to facilitate the carrying out of the method of inner tube construction to be hereinafter described. This trimming may be accomplished in any suitable manner such as cutting it with a knife held against the rotating drum.

Referring to Fig. 6, the edge X—X of the sheet and the line Y—Y designate the boundaries of the area 72 of the rubber sheet to be coated with the nonadhesion agent. The lines X—X and Y—Y are separated a distance substantially equal to the internal circumference of the inner tube to be fabricated. The portion of the rubber sheet adjacent the edge X—X is folded over the remaining treated portion 72 until the edge X—X substantially coincides with the line Y—Y. A marginal portion of the edge X—X is then turned under as shown at 79 and the untreated surface of such margin pressed against and united with the body portion of the sheet. It will now be observed that the folded over portion of the rubber sheet and the portion lying thereunder, form an annular, flat or deflated tube, circumferentially disposed about the drum 22. Instead of turning under a marginal portion of the edge, as indicated at 79, it is also contemplated to form the tube by merely folding over the edge portion of the sheet as before, and a marginal portion which has been left untreated adheres to the untreated sheet adjacent the line Y—Y.

Figure 7:
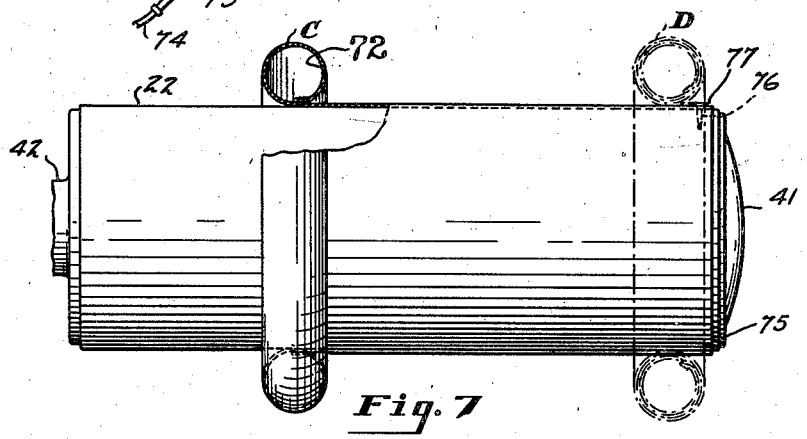
Fig. 7 is a view similar to that shown in Fig. 6, illustrating at C the appearance of the rubber after it has been inflated and the rolling process started, and at D the appearance of the same rubber just before it is completely rolled off the free end of the cylindrical drum.
Figure 8:
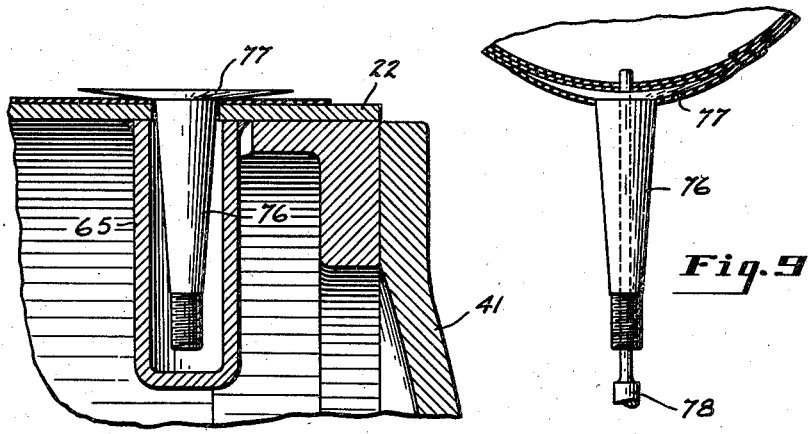
Fig. 8 is a fragmentary section of the free end of the cylindrical drum, showing the recessed pocket provided to receive the valve stem.
Figure 9:
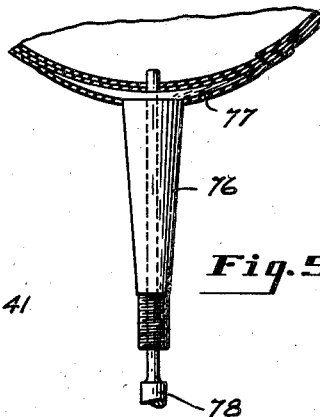
Fig. 9 is a fragmentary view, in section, of a portion of the inner tube after it has been rolled off the free end of the cylindrical drum, illustrating the construction of the inner tube in the vicinity of the valve stem.

An air needle 73 connected to a suitable compressed air supply by a suitable flexible conduit 74 is then inserted through the folded-over portion of rubber film or sheet and the circumferentially disposed tube is inflated and it then assumes the shape indicated at C of Fig. 7. In this inflation process it will be seen that all of the circumferentially disposed elements constituting this tube will be more or less elongated except the elements lying adjacent the cylindrical drum 22. When the tube has been inflated to the desired size, the air needle 73 is removed, the character of the rubber film being such that the hole made by the air needle is substantially sealed when the tube is wrapped on itself. In this inflated position the rubber tube circumferentially disposed about the drum 22 is rolled upon the thin rubber film or sheet towards the free end 75 of drum 22. It will be observed that in this operation the rubber film wraps about the inflated rubber tube in a plurality of concentric layers and, in cross-section, would appear as at D of Fig. 7 to be progressively compacted laminations. Just before the tube reaches the free end 75 of the cylindrical drum 22 a valve stem 76 is inserted through the rubber film or sheet, which is still circumferentially disposed about the drum 22, and extends into the pocket 65 carried by the drum. Because the recessed portion 65 of the drum 22 does not contact the dip roller 26, the elastic film is not formed over the pocket which opens to the surface of the drum. If the inflated rubber tube be now completely rolled off the free end 75 of the cylindrical drum 22, it will be seen that the valve stem 76 is carried therewith and the enlarged base 77 of the said valve stem 76 is secured between the outer and the second outer layers of the rubber film constituting the tube. If a suitable heated probe 78 be now inserted through the valve stem 76, it will puncture the inner concentric layers of the rubber film constituting the tube and permit the inflation or deflation of the tube by means of the valve stem 76. When the rubber tube is removed from the free end 75 of the drum 22 it is ready to be finally treated or cured by any conventional vulcanizing process. If it is desired to produce a tube of larger size, it may be inflated until it reaches suitable dimensions.

During the process of rolling a tube from the position C to the position D of Fig. 7, it will be apparent that the successive circumferential elements of the rubber film will alternately stretch and contract. This is advantageous in the process of inner tube construction, for it stabilizes the successive concentric layers of rubber in relation to one another and compacts the laminations, so that the resultant tube is substantially free from internal stresses and of uniform construction.

The apparatus that I have disclosed may be modified in many ways, and the process used in connection with it may be varied, within the spirit of my invention, to produce many different types of pneumatic tubes for tires. For example, if the length of the roller 26 is adjusted so that a greater or lesser portion of the cylindrical drum 22 is coated with rubber latex from the tank 25, inner tubes of different numbers of concentric layers of rubber may be constructed. By varying the width of the initial fold, the size of the tube can be regulated. Even if a large sized tube is desired, it sometimes may be advantageous to commence with a small sized tube and then, after it has been rolled off the free end 75 of the drum 22, or at some intermediate point, it may be inflated to any desired size, as hereinabove mentioned. Regulating the amount of rubber latex or cement transferred from the tank 25 to the cylindrical drum 22 by the rollers 26 and the number of turns of the drum 22 controls the thickness of the rubber film formed on the drum 22.

Although a single embodiment of the invention has been herein shown and described, it will be understood that numerous modifications of the construction shown and of the method and process described may be resorted to without departing from the spirit of this invention as defined in the appended claims.

What I claim is:

1. The method of producing inner tubes for pneumatic tires which comprises forming an elastic sheet on a drum, folding an end portion of said sheet over an adjoining portion and uniting the marginal portion of said end portion to the sheet to form a closed annular tube circumferentially disposed about said drum, inflating said tube, rolling said inflated tube over the remaining portion of the sheet, removing said inflated tube from said drum, and curing the tube.

2. The method of producing pneumatic inner tubes comprising the steps of forming an elastic sheet on a drum, circumferentially trimming the edges of said sheet, folding one edge of said sheet over the adjacent body portion thereof and joining said edge circumferentially about said drum to said body portion of the sheet to form a flat tube circumferentially disposed about the drum, inflating the tube, rolling the inflated tube over the remaining portion of the sheet, and curing the tube, whereby a tube of homogeneous composition is formed.

3. The method of producing inner tubes for pneumatic tires comprising the steps of forming an elastic sheet on a drum, circumferentially trimming the edges of the sheet, coating a portion of the sheet adjacent the edge with a substance to render said portion non-adhesive, folding one edge of the sheet over the adjoining body portion of the sheet and turning under the marginal portion of the edge portion of the sheet and uniting the marginal edge portion of the sheet to an uncoated portion of the sheet adjacent said coated portion, thereby forming an annular tube circumferentially disposed about the drum, inflating the tube, rolling the inflated tube over the remaining portion of the sheet, removing the tube from the drum, and curing the tube.

4. The method of producing inner tubes for pneumatic tires which comprises forming an elastic sheet on a rotatable drum having one end free, trimming the edges of the sheet circumferentially around the drum, coating the portion of the sheet adjacent one end with a substance to render said portion of the sheet non-adhesive, folding over the end portion of the sheet and joining the said end portion circumferentially with the centrally disposed uncoated portion of the sheet to form an annular tube circumferentially disposed about the drum, inflating the tube, inserting a valve stem through the sheet adjacent the free end of the drum with the base of the valve stem in engagement with the sheet, rolling the inflated tube over the remaining portion of the annular sheet which progressively adheres to and becomes a part of the annulus, removing the tube so formed from the drum and curing the same.

5. The method of producing inner tubes for pneumatic tires which comprises forming an elastic sheet on a drum having a free end, treating an end portion of said sheet with a substance to render said portion non-adhesive, folding said end portion of the sheet to form an annular flat tube circumferentially disposed about said drum, inflating said tube, and rolling said inflated tube over the remaining portion of said sheet and off the free end of said drum to form a plurality of compacted laminations about said inflated tube.

6. The method of producing inner tubes for pneumatic tires which comprises forming an elastic sheet on a drum, folding an end portion of said sheet over an adjoining portion to form a continuous flat tube circumferentially disposed about said drum, inflating said tube, inserting through said sheet at a position substantially removed from said circumferentially disposed tube a valve stem having an enlarged base portion in engagement with said sheet, stripping said inflated tube from said drum by rolling it over the remainder of the sheet and said valve base disposed thereon to form an inner tube of progressively compacted laminations with the valve base secured under the outer lamination, and curing said tube.

7. The method of producing inner tubes for pneumatic tires which comprises forming an elastic sheet on a drum, folding an end portion of said sheet over an adjoining portion to form a continuous flat tube circumferentially disposed about said drum, inflating said tube, inserting through said sheet at a position substantially removed from said circumferentially disposed tube a valve stem having an enlarged base portion in engagement with said sheet, stripping said inflated tube from said drum by rolling it over the remainder of the sheet and said valve base disposed thereon to form an inner tube of progressively compacted laminations with the valve base secured under the outer lamination, forming an inflation opening through the laminae of said inner tube beneath the valve stem, and curing said tube.

HANS WAGNER.